United States Patent [19]
Bright

[11] 3,942,176
[45] Mar. 2, 1976

[54] ULTRASONIC ALARM SYSTEM

[75] Inventor: Thomas F. Bright, Paterson, N.J.

[73] Assignee: Bergen Laboratories, Inc., Paterson, N.J.

[22] Filed: Feb. 4, 1974

[21] Appl. No.: 439,409

[52] U.S. Cl. ................. 340/416; 340/15; 340/287; 340/301; 340/312; 200/61.74
[51] Int. Cl.² ..................... G08B 1/08; H04B 11/00
[58] Field of Search ........ 340/224, 311, 312, 384 E, 340/277, 276, 365 R, 416; 200/61.78, 61.74

[56] References Cited
UNITED STATES PATENTS

| | | | |
|---|---|---|---|
| 2,766,358 | 10/1956 | Davidson | 340/277 |
| 3,376,506 | 4/1968 | Sontag | 340/311 |
| 3,418,650 | 12/1968 | Rich et al. | 340/311 |
| 3,440,635 | 4/1964 | Hull | 340/224 |
| 3,478,344 | 11/1969 | Schwitzgebel et al. | 340/311 |
| 3,696,384 | 10/1972 | Lester | 340/312 |

Primary Examiner—Thomas B. Habecker
Attorney, Agent, or Firm—Ryder, McAulay, Fields, Fisher & Goldstein

[57] ABSTRACT

An ultrasonic alarm system comprising a transmitter having an oscillator which produces an ultrasonic carrier frequency signal. An audio signal generator produces a signal which modulates the carrier signal. The modulated signal is applied to a crystal through a tuned circuit. The transmitter is energized by operating a pushbutton which remains latched in operative position and which is unlatched only by the use of special devices. A plurality of receivers are provided and individual receivers are positioned at different locations throughout the premises to be protected. Each receiver includes a demodulator that demodulates the received signal and applies the same to a phase locked loop type phase detector which actuates an alarm when the demodulated signal is present. The alarm indicates the particular receiver that has been activated so that help may be dispatched immediately to the correct location.

10 Claims, 6 Drawing Figures

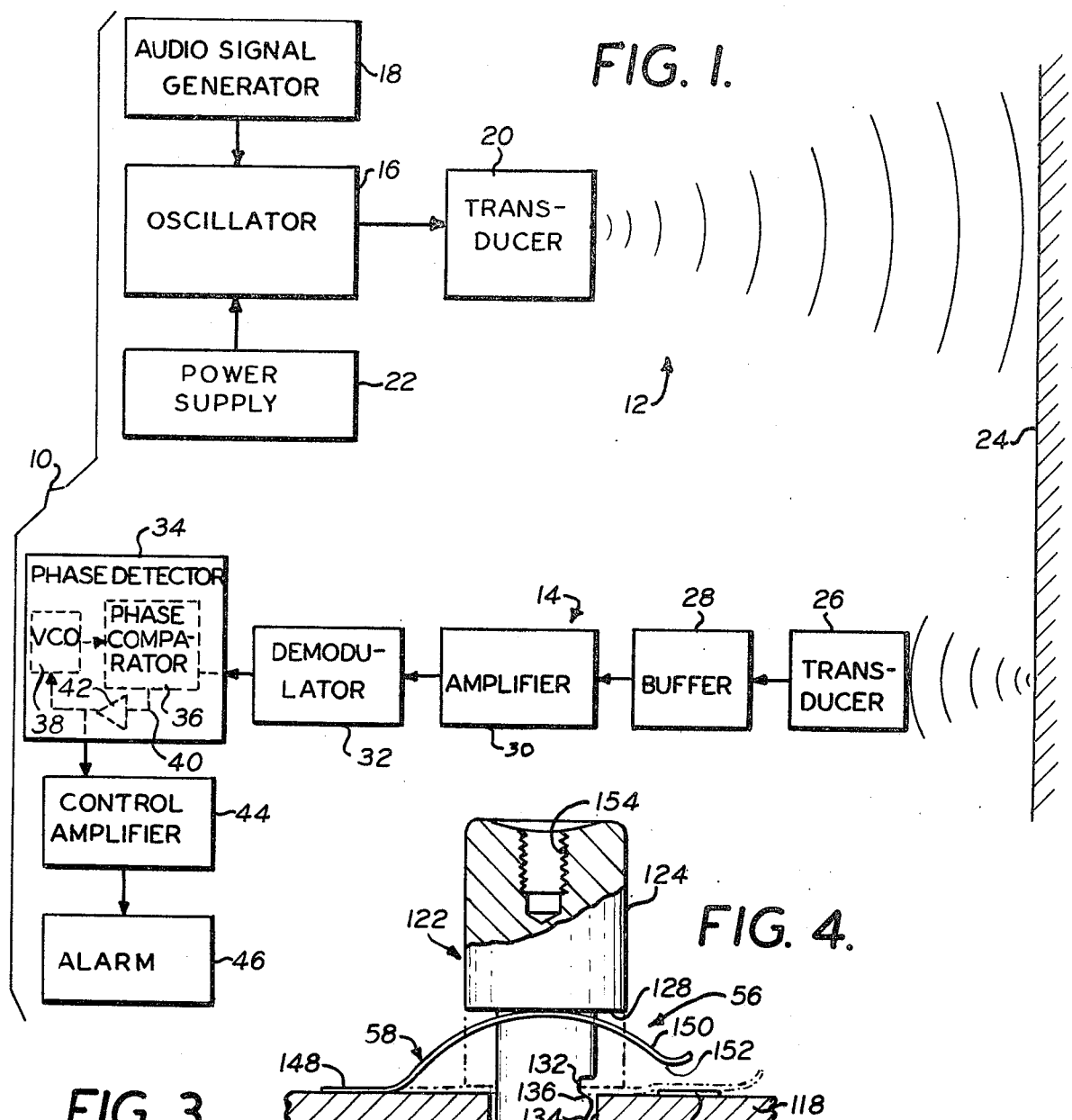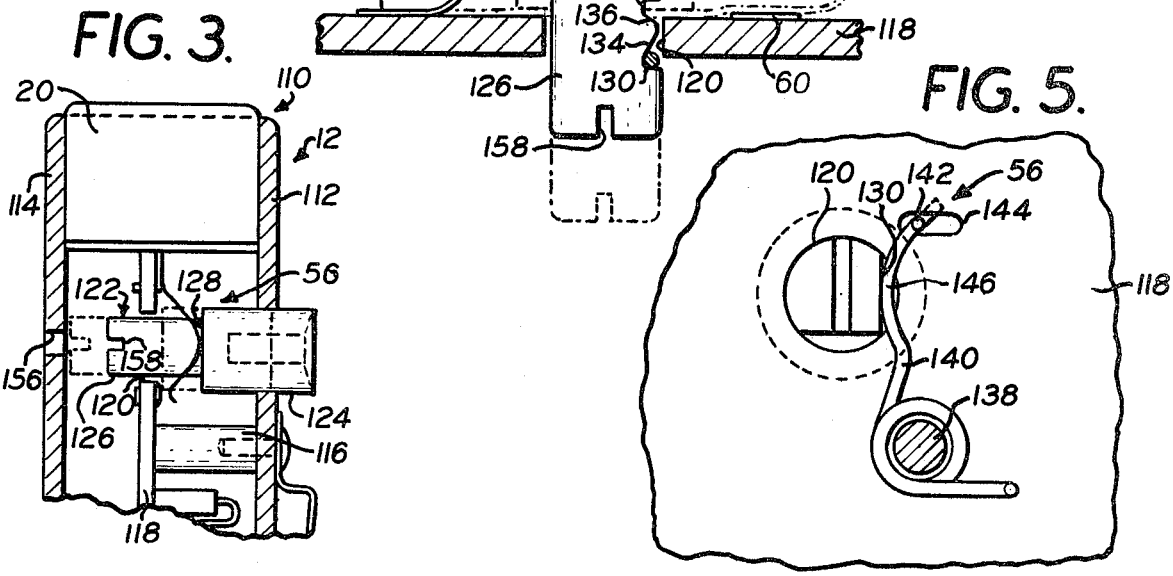

TRANSMITTER 12

RECEIVER 14

ULTRASONIC ALARM SYSTEM

This invention relates generally to an ultasonic alarm system and, more particularly, pertains to a personnel alarm system including a transmitter that, when operated, is automatically locked in the transmit state to continuously broadcast an alarm signal.

The alarming increasing incidence of criminal acts perpetrated agains persons working alone or in small groups has given rise to the need for alarm systems that are simple and foolproof in their operation. Moreover, where the premises to be protected are large and contain many rooms such as schools or the like, it is necessary that the alarm system also pinpoint the origination of the alarm signal so that aid may be dispatched immediately to the correct location.

At present, there are many types of so-called security alarm systems which transmit an alarm signal to a receiver when activated by a person under attack. However, for the most part, many of these systems lack the ability to indicate the location of the transmitter broadcasting the alarm signal. Additionally, many of these systems operate in the radio frequency (RF) spectrum and therefore have a number of disadvantages associated with their use. For example, the Federal Communications Commission requires security alarm systems using RF signals to have a duty cycle such that the transmitter broadcasts for one second followed by a thirty second off interval. As a result, transmission of the alarm signal is discontinuous. Hence, if the alarm signal is not immediately detected on the first transmission, precious time will pass until the second transmission. Moreover, the RF signal penetrates walls and other obstacles thereby increasing the difficulty for pinpointing the location of the source of the signals. Additionally, RF systems require antennas thereby increasing the necessary volume required for the transmitter. Another major disadvantage associated with prior art systems is the fact that the attacker can easily turn off the alarm system transmitter.

Accordingly, an object of the present invention is to provide an improved security or personnel alarm system.

A more specific object of one aspect of this invention is to provide an alarm system employing ultrasonic signals which are continuously broadcast to facilitate quickly locating the source of the alarm signals.

A further object of this invention is to provide an alarm system which includes a transmitter that latches or locks in the operated state once it is activated thereby preventing unauthorized personnel from deactivating the transmitter.

Another object of the invention is to provide an alarm system that indicates at a central location the source of the alarm signals.

A further object of the present invention resides in the novel details of construction that provide an alarm system of the type described wherein the alarm signal transmitter occupies a minimum volume and can be carried unobtrusively on the person.

Another problem associated with prior art systems is the insensitivity of the system to false signals such as noise. Thus, another object of the present invention is the provision of an alarm system having a receiver that includes a sensitive detecting arrangement to increase reliability of the system.

Accordingly, an alarm system constructed according to the present invention comprises a transmitter wherein the transmitter comprises an ultrasonic carrier frequency signal generator. Modulation means is provided for modulating the carrier signal with a modulation signal and transmission means transmits the modulated ultrasonic carrier signal to at least one receiver. The receiver comprises receiving means for receiving the transmitted modulated ultrasonic carrier signal and demodulating means for demodulating the carrier signal to obtain the modulation signal. Detector means is connected to the demodulating means and is responsive to a predetermined characteristic of the modulation signal for producing an alarm actuation signal which, in turn, may operate an alarm to indicate the necessity for aid at a particular location.

As noted above, the present system utilizes a transmitter which transmits ultrasonic signals to a receiver when the transmitter is energized by the operator. However, it has been found that external sources of ultrasonic signal can cause false triggering of such alarm systems. For example, jangling keys or air conditioners have been found to produce flase alarm signals. Moreover, it has been found that multipath distortion may completely mask the transmitted alarm signal so that an alarm condition will not be detected.

Accordingly, a feature of the present invention is to provide an ultrasonic alarm system which transmits a modulated carrier frequency signal to a receiver where the frequencies of the carrier signal and the modulating signal are selected to produce freedom from false triggering and from multipath distortion.

Other features and advantages of the present invention will become more apparent from a consideration of the following detailed description when taken in conjunction with the accompanying drawings, in which:

FIG. 1 is a circuit diagram in block form of the alarm system of the present invention;

FIG. 3 is a sectional view, with parts broken away in the interest of clarity, of the actuating switch portion of the transmitter;

FIG. 4 is a detailed view, to an enlarged scale, of the switch shown in FIG. 3;

FIG. 5 is a detailed view, to an enlarged scale, of the latch portion of the switch arrangement shown in FIG. 4.

Figure 2:
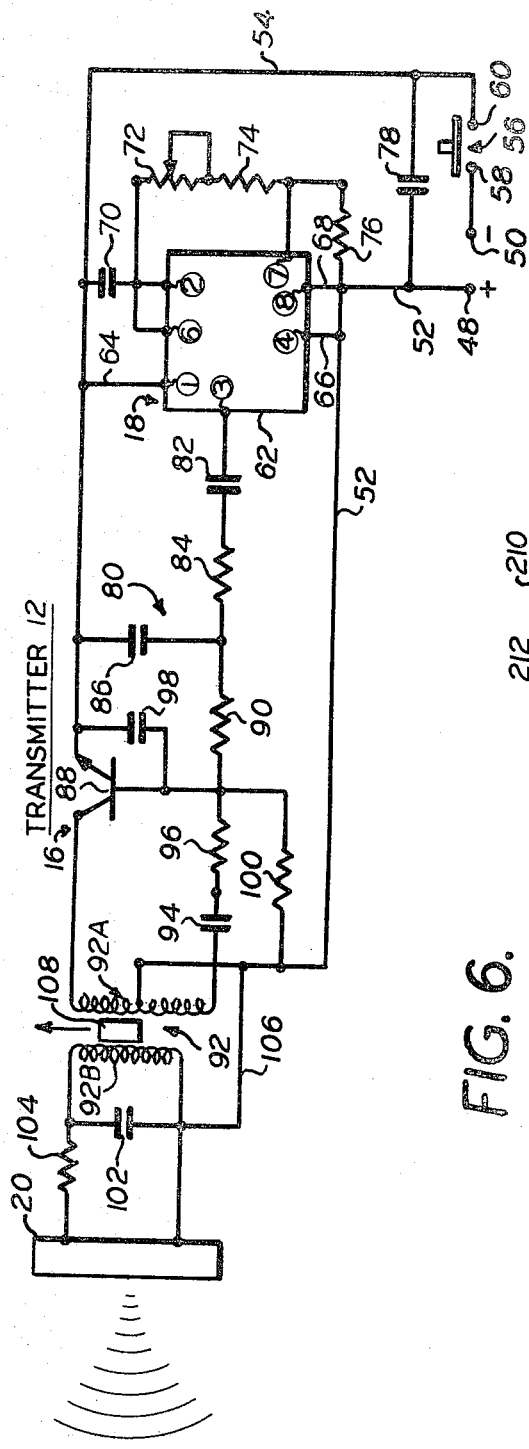
FIG. 2 is a schematic circuit wiring diagram of the transmitter portion of the alarm system shown in FIG. 1.

The basic ultrasonic alarm system of the present invention is designated generally by the reference number 10 in FIG. 1 and includes a transmitter 12 and a plurality of receivers 14, one of which is shown in FIG. 2, although if the premises to be protected is relatively small only one receiver need be used. The transmitter 12 may be miniaturized so that it can easily be carried on the person or may even be included in a piece of jewelry such as a locket or the like. If the personnel to be protected are within a large building such as a school or the like having individual classrooms, a separate receiver 14 may be located in each such classroom. Since the present invention utilizes the transmission of ultrasonic signals to signify an alarm condition, the signals will not pass through walls or similar barriers. As a result, only the receiver located within a specific confined area such as a room will detect the signals originating within that room. Hence, it is contemplated that each such receiver will be connected to an individual indicator on an indicating board at a central location, as noted in greater detail below, so that upon detection of an alarm condition help may immediately be dispatched to the receiver that has been activated. Additionally, movement of the person attached from one location to another will similarly be indicated since different receivers will be actuated successively.

More specifically, the transmitter 12 includes an oscillator 16 that generates an ultrasonic carrier frequency signal. An audio signal generator 18 is coupled to the oscillator 16 and modulates the carrier signal with the audio signal to produce an amplitude modulated (AM) signal that is applied to a transducer 20. The transducer 20 comprises a piezoelectric device or crystal that converts the AM carrier electric signal into ultrasonic waves.

Power for the transmitter 12 is derived from a power supply 22. As noted in greater detail below, the power supply 22 includes a latchable switch so that when the switch is operated it becomes locked in the operated position. As a result, power is continuously supplied to the transmitter circuit thereby causing the transmitter to continuously transmit an alarm signal. Moreover, special tools or devices are required to unlock the switch and deenergize the transmitter so that unauthorized personnel cannot stop the alarm signal once the transmitter has been triggered or actuated.

In prior ultrasonic alarm systems, it has been found that if the frequency of the modulation signal is too low, false alarm signals may be generated simply by jangling keys or the like. Also, devices such as air-conditioning systems and the like have caused erroneous alarm signals. On the other hand, if the frequency of the modulation signal is too high multipath distortion of a true alarm signal may mask the signal so that the signal will not be detected. Accordingly, as noted in greater detail below, the frequencies of the modulation signal and the carrier signal are chosen to minimize or substantially eliminate false triggering or masking of the alarm signal.

The ultrasonic signal transmitted by the transducer 20 is reflected from the various surfaces defining the protected premises such as a wall 24, and is received by the receiver 14. The receiver 14 includes a transducer 26 which may comprise a piezoelectric device or crystal that converts the ultrasonic signal into a modulated carrier electric signal which is applied to a buffer stage 28. The output terminals of the buffer stage 28 are connected to the input terminals of an amplifier 30 that amplifies the signal and applies the modulated carrier signal to a demodulator 32. The demodulator 32 demodulates the AM carrier signal to retrieve the modulated signal therefrom and applies the same to a phase detector 34. The phase detector 34 utilizes a phase locked loop so that the receiver is provided with a high degree of selectivity to an alarm signal.

More specifically, the phase detector 34 includes a phase comparitor 36 having a first set of input terminals which receive the demodulated signal from the demodulator 32 and a second set of input terminals which receive the output signal from a voltage controlled oscillator or VCO 38. The center frequency of the VCO 38 is chosen to be the same as the frequency of the modulating signal. If the frequency of the signal received at the first set of input terminals to the comparitor 36 is different from the frequency of the signal produced by VCO 38 an error signal is produced by the comparitor on a lead 40 that is applied to the VCO 38 through an amplifier 42. As is conventional, the error signal changes the frequency at the output terminals of the VCO 38 until it is equal to the frequency of the input signal. When the frequency of the two input signals are equal, the error signal on the lead 40 will become substantially zero. The output signal of the amplifier 42, which corresponds to the output signal of phase detector 34, is connected to the input terminals of a control amplifier 44. The control amplifier 44, in turn, is connected to and controls the operation of an alarm 46.

In the absence of an alarm signal, the phase comparitor 36 receives an input signal only at the second set of terminals which are connected to the VCO 38. Accordingly, an error signal will always be present at the output of the amplifier 42 in the absence of the alarm signal. The operation of the control amplifier 44 is such that when the amplifier is receiving a signal from the phase detector 34, the alarm 46 will not be actuated. When the alarm signal is actually received by receiver 14, the error signal produced by the detector 34 decreases to substantially zero potential thereby rendering the control amplifier 44 inoperative and causing an alarm actuation signal to be applied to the alarm 46. As a result, the system provides a fail-safe condition wherein if the control amplifier 44 ceases to operate either by the absence of the error signal (due to reception of the alarm signal) or by a loss of power (as when the power leads to the amplifier are cut) an alarm actuation signal is applied to the alarm 46 to indicate an alarm condition.

A schematic circuit wiring diagram of transmitter 12 is shown in FIG. 2. The transmitter 12 includes a pair of input terminals 48 and 50 that are adapted to be connected to the respective positive and negative terminals of a DC source of potential (not shown). Connected to the terminal 48 is a lead 52 and a lead 54 is connected to the terminal 50 through a normally-open latchable pushbutton switch 56. The construction of the switch 56 is described in detail below in conjunction with FIGS. 3, 4 and 5. Briefly, the switch 56 includes contacts 58 and 60 which are connected together when the switch is depressed or operated thereby to cause energization of the elements comprising the transmitter 12. Moreover, once operated from the open position to the closed position, the switch is locked in the closed position so that the transmitter 12 continuously broadcasts an alarm signal.

Connected to the leads 52 and 54 is the audio signal generator 18. The audio signal generator comprises a square wave generator 62 and, for purposes of illustration the square wave generator 62 may comprise a Signetics Corporation (811 E. Arques Avenue, Sunnyvale, California 94086) NE555 monolithic timing circuit or timer. The connections to the specific terminals of the Signetics Corporation integrated circuit will therefore be used in the following discussion and details on the circuit may be had by reference to the application notes published by the manufacturer. However, it is specifically emphasized that this is for illustrative purposes only and is not to be interpreted as being a limitation on the present invention. That is, any audio signal generator which generates an audio wave of the proper frequency may be used.

Terminal 1 of the circuit 62 is connected to the lead 54 by a lead 64. Terminals 4 and 8 are connected to the lead 52 by respective leads 66 and 68. Terminals 2 and 6 of the integrated circuit 62 are connected together and to the lead 54 through a capacitor 70. Connected between terminals 2 and 7 is a series circuit comprising a potentiomter 72 and a resistor 74. The sliding arm of the potentiometer is connected to the junction of the potentiometer and the resistor. Additionally, a resistor 76 is connected between terminals 7 and 8. As set forth in the notes published by the Signetics Corporation with regard to their 555-timer, the frequency of oscillator of the generator is given by the relationship $f = 1.46 /(R_A + 2R_B)C$ where:

$R_A$ is the resistance of resistor 76;

$R_B$ is the resistance between terminals 6 and 7 of circuit 62; and

C is the value of capacitor 70.

Hence, by properly choosing the values of the aforementioned elements, the frequency of oscillation of the output signal of circuit 62 appearing at terminal 3 can be set to a desired value. A capacitor 78 is connected between the leads 52 and 54 in parallel with the series circuit comprising the input terminals 48 and 50 in the switch 56 and serves as a by-pass for the audio frequency signals.

Output terminal 3 of the audio signal generator 18 is connected to the oscillator 16 through a low pass filter designated generally by the reference character 80. More particularly, the coupling capacitor 82 is connected to one end of a resistor 84, the other end of which is connected to the lead 54 through a capacitor 86. The resistor 84 and the capacitor 86 form a low pass filter which passes only the low frequencies comprising the square wave generated by the signal generator 18. Accordingly, the signal appearing at the junction of the capacitor 86 and the resistor 84 is almost a sine wave. This signal modulates the signal generated by oscillator 16 to produce the modulated carrier frequency signal.

The junction of capacitor 86 and resistor 84 is connected to the base electrode of a transistor 88 through a resistor 90. The emitter electrode of the transistor 88 is connected to the lead 54 and the collector electrode thereof is connected to one side of the primary winding 92A of a transformer 92. The other end of the transformer 92A is connected to the base electrode of the transistor 88 through a series circuit comprising a capacitor 94 and a resistor 96. Additionally, a capacitor 98 is connected between the base and emitter electrodes. The lead 52 is connected to a center tap of the transformer winding 92A and the base electrode of the transistor 88 is also connected thereto through a resistor 100.

The secondary winding 92B of the transformer 92 forms a tuned circuit with a capacitor 102 connected in parallel therewith. One side of the tuned circuit is connected to the transducer 20 through a resistor 104. The other side of the tuned circuit is similarly connected to the transducer 20 and via a lead 106 to the center tap of the primary winding 92A.

The oscillator 16 is a Hartley type oscillator with feedback between the collector and base electrodes obtained inductively through each half of the primary winding 92A. A movable slug 108 is provided in the transducer for fine tuning purposes. The capacitor 98 is provided to sustain oscillations at all frequencies of interest. Additionally, the resistor 104 isolates the crystal and tuned circuit so that a smooth frequency response is obtained. In other words, frequency pulling due to abrupt impedance changes in the crystal 20 as the signal across the tuned circuit passes through the resonant frequency of the crystal is eliminated.

As noted hereinabove, if the frequency of the modulating signal is too low, alarm systems of the type under consideration may be falsely triggered by air-conditioners, jangling keys and the like. On the other hand, if the modulating signal is too high the ultrasonic signal transmitted by the transducer 20 may be masked by multipath distortion. Accordingly, the modulating signal and the carrier signal are selected to eliminate or minimize these two conditions. The frequency of the carrier signal is selected to be 40KHz and the frequency of the modulating signal is selected to be 300Hz.

When the switch 56 is operated to the closed position, the audio signal generator 18 is energized to produce a square wave at terminal 3. Additionally, the oscillator 16 is also energized to produce the carrier signal. The audio signal from the generator 18 is filtered by the low pass filter 80 to produce substantially a sine wave at the base electrode of the transistor 16 which, in effect, amplitude modulates the carrier signal. This modulated signal is coupled to the tuned circuit through the transformer 92 and applied to the piezoelectric device or ceramic crystal 20 which converts the electrical signals into an ultrasonic signal. The resistor 104, as noted above, prevents the crystal from jumping from one frequency mode of oscillation to the next frequency mode of oscillation.

The switch 56 is shown in greater detail in FIGS. 3–5. More specifically, the transmitter 12 includes a housing 110, a portion of which is shown in FIG. 3, which encloses the circuit elements. The housing includes a top wall 112 and a bottom wall 114. The transducer 20 is positioned between the walls 114 and 112 and extends outwardly at the side of the housing to permit transmission of the ultrasonic signals. Mounted between the top and bottom walls by a stud and screw arrangement 116 is a circuit board 118 on which the components comprising the transmitter circuit are mounted. Provided in the board 118 is a through bore 120 which slidingly receives an operating member or pushbutton 122 of the switch 56.

The member 122 includes an enlarged diameter portion 124 and a depending reduced diameter shaft 126 which define an annular shoulder 128 therebetween. Provided on the shaft 126 are vertically spaced open ended grooves 130 and 132 (FIG. 4) which are connected by a cam surface 134 that tapers upwardly and outwardly from the inner wall of the groove 130. Moreover, the bottom wall 136 of the groove 132 tapers downwardly and outwardly from the inner wall thereof for reasons which will become apparent from a description of the latching arrangement below. Depending from the bottom surface of the board 118 adjacent the bore 120 is a boss 138 (FIG. 5) that supports a bent spring member 140. The spring member 140 is provided with an upstanding end portion 142 that extends through an elongate slot 144 in the board 118. The member 140 is provided with an intermediate curved portion 146 that normally bears against and is received within the groove 130.

Contact 60 of the switch 56 is a stationary contact that is mounted on the board 118 adjacent the member 122. On the other hand, the contact 58 is a movable contact having one end 148 affixed to the board 118. The contact 58 is bifurcated at the other end and the shaft 126 extends between the arms 150 (one of which is shown in FIG. 4) defining the bifurcated end. The end 152 of the arms 150 is turned upwardly and is adapted to engage the contact 60 which it normally overlies. The bifurcated arms are concave upwardly and normally engage the shoulder 128 of the member 122. Additionally, the contact 58 is fabricated from a spring steel or other type of resilient and flexible conducting material so that the contact normally biases the member 122 to the position shown in FIG. 4.

When it is desired to actuate the transmitter 12, the member or pushbutton 122 is depressed whereupon the intermediate portion 146 of the spring 140 rides upwardly on the cam surface 134 of the shaft 126 until it snaps back and is received within the groove 136. The downward movement of the member 122 effects concomitant movement of the arms 150 of the contact 58 thereby moving the upturned end 152 into contact with the contact 60 (as shown in phantom lines in FIG. 4) to effect actuation of the transmitter. Moreover, the engagement of the spring member 140 in the slot 132 maintains or latches the member 122 in the operated position.

FIG. 3 illustrates the position of the pushbutton or member 122 in its operated position by the phantom line drawing. It is emphasized that the enlarged portion 124 is sized and positioned relative to the housing 110 so that the uppermost surface of the enlarged portion 124 lies below the surface of the top wall 122 of the housing. As a result, the member 122 is completely inaccessible to parties once the transmitter has been activated by depression of the member. As a result, the transmitter 12 cannot be disabled by unauthorized personnel.

To return the member 122 to its normal position and thereby the deactivate the transmitter, a threaded opening 154 is provided in the top surface of the enlarged portion 124. A threaded member such as a screw is adapted to be threadedly engaged within the opening 154. An upward force exerted on the threaded member (not shown) will cause the spring member 140 to ride downwardly on the sloping lower wall 136 of the groove 132 to release the member 122 and permit it to return to the normal position.

Alternatively, a through bore 156 is provided in the bottom wall 114 of the housing 112. The opening 156 is aligned with the bottom wall of the shaft 126 of the member 122. A slot 158 is provided in the bottom wall of the shaft. In order to release the member 122 and permit it to return to its normal operating position, a thin bladed device such as a screw driver may be inserted into the opening 156 and into the slot 158 after the member has been moved to the operating position. Rotation of the shaft will cause the peripheral wall defining the shaft to move the member 140 to the right, as taken in FIG. 5, and out of the groove 136 thereby permitting the member 122 to move upwardly under the normal spring bias of the contact 58. The member may then be rotated back to its normal position whereby the spring member 140 is again engaged in the groove 130.

Figure 6:
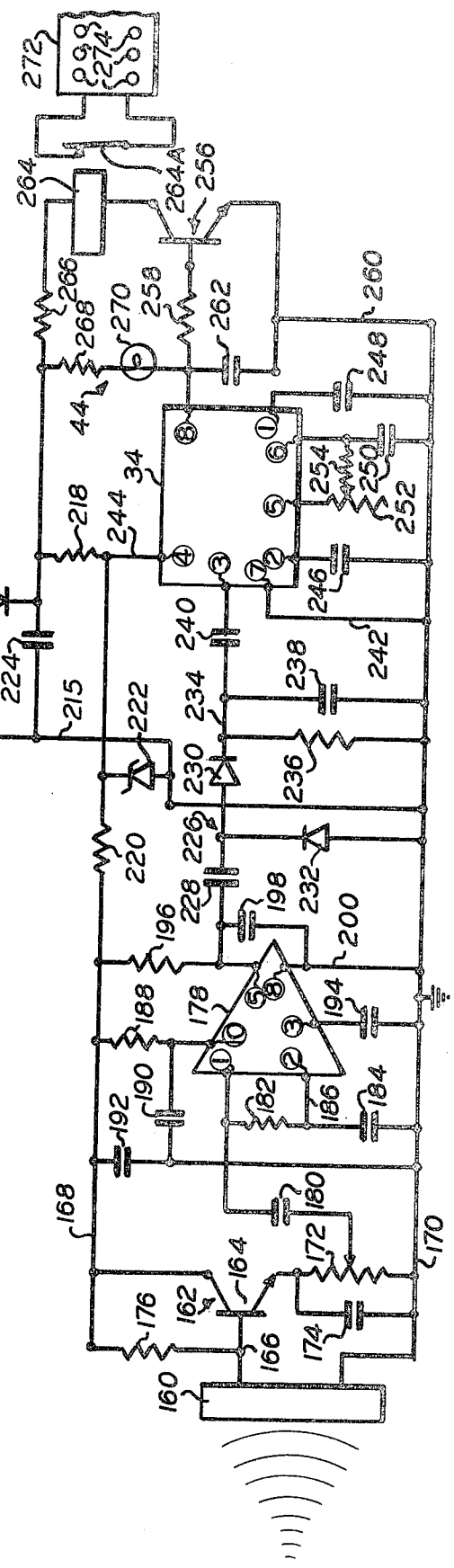
FIG. 6 is a schematic circuit wiring diagram of the receiver and alarm portion of the alarm system shown in FIG. 1.

The receiver 14 is shown in FIG. 6 and comprises a transducer 160 which may comprise a piezoelectric device or ceramic crystal tuned to the frequency under consideration. The transducer 160 is connected to the buffer 28 which in the embodiment under consideration comprises an emitter follower stage designated generally by the reference numeral 162. More specifically, the emitter follower comprises a transistor 164 the base electrode of which is connected directly to the transducer by a lead 166. The collector electrode of the transistor 164 is connected to a lead 168 and the emitter electrode is connected to a lead 170 through a potentiometer 172. The lead 170 is also connected to the transducer 160 and to the emitter electrode through a capacitor 174. The base electrode is also connected to the lead 168 through a resistor 176. The emitter follower stage 164 provides a high input impedance for the ceramic crystal transducer and a low output impedance across the potentiometer 172.

The sliding arm of the potentiometer 172 is connected to an input terminal of an amplifier 178 through a capacitor 180. The sliding arm of the potentiometer 172 may be adjusted so that a desired level of signal is fed into the amplifier 178. The amplifier 178 may comprise an RCA CA3011 integrated circuit amplifier. Accordingly, the terminal designations for the aforementioned amplifier will be disclosed herein. However, it is emphasized that this amplifier is for illustrative purposes only and is not to be interpreted as being a limitation on the present invention as any such amplifier may be used thus, the capacitor 180 is connected to terminal 1 of the amplifier.

Connected between terminal 1 of the amplifier 178 and lead 170 is a series circuit comprising a resistor 182 and a capacitor 184. The other input terminal 2 of the amplifier is connected to the junction of the resistor 182 and the capacitor 184 by a lead 186. Terminal 10 of the amplifier 178 is connected to the lead 168 through a resistor 188. Additionally, terminal 10 is connected to the lead 168 through a series circuit comprising capacitors 190 and 192. The junction of capacitors 190 and 192 is connected to the lead 170. Terminal 3 of the amplifier 178 is connected directly to the lead 170 through a capacitor 194. Connected to terminal 5 of the amplifier is one end of a resistor 196, the other end of which is connected to lead 168. Connected between terminals 5 and 8 of the amplifier is a capacitor 198. Additionally, terminal of the amplifier is connected to the lead 170 through a lead 200. The lead 170 is connected to ground.

Power for the receiver 14 is obtained from an AC source 210 connected between input terminals 212 and 214. The source 210 may comprise a 12 volt AC source. The terminal 212 is connected to the lead 170 by a lead 215. On the other hand, the terminal 214 is connected to the lead 168 through a series circuit comprising a diode 216, resistor 218 and another resistor 220. The diode 216 is polarized so that the anode electrode thereof is connected to the terminal 214. Accordingly, a half-wave recified signal will be applied to the lead 168. Voltage regulation is obtained by a zener diode 222 connected between the lead 215 and the junction of resistors 218 and 220. Additionally, filtering is obtained by a capacitor 224 that is connected between the junction of the diode 216 and the resistor 218 and the lead 215.

The output signal from the amplifier 178 which appears between the terminals 5 and 8 is connected to the diode demodulator stage designated generally by the reference number 226 which corresponds to the demodulator 32 of FIG. 1. More specifically, the stage 226 comprises a blocking capacitor 228 one end of which is connected to the terminal 5 of the amplifier 178. The other end of the capacitor 228 is connected to the junction of diodes 230 and 232. The diode 232 is polarized so that the cathode electrode thereof is connected to the anode electrode of the diode 230 and the anode electrode thereof is connected to the lead 170. The cathode electrode of the diode 230 is connected by a lead 234 to one side of a parallel circuit comprising a resistor 236 and a capacitor 238; the other side of the parallel circuit being connected to the lead 170. A coupling capacitor 240 connects the lead 234 to the phase detector 34.

As noted hereinabove, the phase detector 34 comprises a conventional phase locked loop device. In the example under consideration, a Signetics Corporation phase locked loop linear integrated circuit designated NE567V may be utilized and the terminal connections for such device will be disclosed herein in conjunction with the present disclosure. Details on the circuit may be obtained from the application notes published by the manufacturer. However, it is emphasized that this particular phase locked loop device is for illustrative purposes only and is not to be interpreted as being a limitation on the present invention. That is, any phase locked loop of similar construction may be utilized.

The capacitor 240 is connected to the input terminal 3 of the phase detector 34. Terminal 7 thereof is connected to the grounded lead 170 by a lead 242. Power input terminal 4 is connected to the junction of resistors 218 and 220 by a lead 244. Terminal 2 of the circuit is connected to the lead 170 through a capacitor 246. Additionally, terminal 1 is also connected to the lead 170 through a capacitor 248. The components connected to terminals 5 and 6 of the phase detector determine the band of operative frequencies of the internal oscillator. Accordingly, terminal 6 is connected to the grounded lead 170 through a capacitor 250. Terminal 5 is connected to one end of a potentiometer 252, the other end of which is unconnected. Terminal 6 is connected to the sliding arm of potentiometer 252 through a resistor 254. The output signal appearing at terminal 8 of the phase detector 34 is applied to the control amplifier 44.

The signal appearing at the output terminal 8 of the phase detector 34 is essentially the error signal of the phase locked loop as described above. Therefore, under normal conditions when no alarm signal is received by the receiver, an error signal appears at the terminal 8. However, when an alarm signal is detected by the receiver 14, the level of the error signal appearing at the terminal 8 becomes approximately zero volts. As noted in greater detail below, when the output signal at the terminal 8 becomes approximately zero volts in response to the reception of the alarm signal, an alarm is energized to indicate an alarm condition. Accordingly, in the discussion which follows, the signal of zero volts appearing at the output terminal 8 of the phase detector 34 of FIG. 6 will be termed an alarm actuation signal which, in effect, actuates the alarm to signify the alarm condition. However, this is not to be interpreted as a limitation of the present invention since the invention also contemplates a circuit that produces a high amplitude signal in response to reception of an alarm signal. In other words, the present invention is directed to a device wherein there is a change of state of the of the signal at terminal 8, the specific values of the changes being unimportant.

The terminal 8 is connected to the base electrode of a transistor 256 through a resistor 258. The emitter electrode of the transistor 256 is connected to the grounded lead 170 by a lead 260. Additionally, a capacitor 262 is connected between the terminal 8 of the phase detector 34 and the emitter electrode of the transistor. Connected between the collector electrode of the transistor 256 and the junction of the diode 216, the capacitor 224, and the resistor 218 is a series circuit comprising relay winding 264 and resistor 266. Also connected between the aforementioned junction and the terminal 8 of the phase detector 34 is a series circuit comprising a resistor 268 and a lamp 270.

Under normal circumstances, in the absence of an alarm signal, the error signal appearing at the output terminal 8 of the phase detector 34 will cause the transistor 256 to conduct thereby energizing the relay winding 264. Hence, under normal circumstances the relay is energized to close normally-open relay contacts 264A. The contacts 264A are connected in circuit with an indicator board 272 positioned at a central location. The indicator board 272 is provided with a plurality of indicating devices such as lamps 274, each of which is connected in circuit with the relay contacts of a different receiver and each of which indicates the position of the associated receiver. The indicating devices are connected so that when the contacts 264A open the associated indicating device will be illuminated thereby to indicate the operation and the location of the associated receiver. For example, each one of the lamps 274 may be connected in parallel with the normally-open contacts of a relay, the winding of which is connected in circuit with the contacts 264A and the power source. Hence, when the contacts 264A are closed the associated lamp is normally shorted by the operated contacts of the relay winding in circuit with the contacts 264A. However, when the contacts 264A open the lamp relay winding is deenergized thereby causing the shorting contacts to open to permit the lamp to be illuminated. This feature produces a fail-safe condition for each receiver. In other words, if power is disconnected from any one of the receivers, the relay winding 264 will be deenergized which, in turn, will produce an indication at the board 272.

In operation, assuming that an alarm signal is transmitted by a transmitter 12, the modulated ultrasonic carrier signal will impinge on the crystal 160 which converts the ultrasonic signals into appropriate electrical signals. These signals are passed by the emitter follower 162 to the amplifier 178 which amplifies the modulated carrier frequency signal and applies the same to the demodulator 226. The demodulator stage 226 demodulates the received signal to extract the audio modulation signal therefrom and applies the same to the phase locked loop or phase detector 34. If the demodulated audio signal is of the correct frequency, the signal at the output terminal 8 of the phase detector 34 will become approximately zero thereby cutting off the transistor 256. Accordingly, the relay winding 264 will be deenergized and relay contacts 264A will open. As a result, an alarm condition will be indicated on the board 272. In addition, current will now flow through the lamp 270 to illuminate the lamp. The lamp 270 is located at the receiver so that the party transmitting the alarm signal from the transmitter 12 will obtain a visual indication that the receiver 14 has detected the alarm signal and has produced an alarm indication at the central station. The capacitor 262 is provided to introduce a slight delay before the transistor 256 is rendered nonconducting to eliminate false triggering of the circuit due to transient signals and the like.

In an actual working embodiment of the present alarm system, the following components were utilized in addition to the Signetics Corporation and RCA integrated circuits already identified:

| RESISTORS: | |
| --- | --- |
| 72 | 50Kohms |
| 74 | 120Kohms |
| 76 | 150Kohms |
| 84 | 1.8Kohms |
| 90 | 560ohms |
| 96,172,182,258,266 | 1Kohm |
| 100 | 22Kohms |
| 104,196 | 3.9Kohms |
| 176 | 100Kohms |
| 188,218 | 100ohms |
| 220 | 56ohms |
| 236 | 47Kohms |
| 252 | 25Kohms |
| 254 | 12Kohms |
| 268 | 220ohms |
| CAPACITORS: | |
| 70,98,174,238 | 0.01 $\mu$f |
| 78,192,248 | 10 $\mu$f |
| 82,190,194 | 1 $\mu$f |
| 86,94,180,184,228,240 | 0.1 $\mu$f |
| 102 | 0.0068 $\mu$f |
| 198 | 120 pf |
| 224 | 1,000 $\mu$f |
| 246 | 0.47 $\mu$f |
| 250 | 0.22 $\mu$f |
| 262 | 100 $\mu$f |
| DIODES AND TRANSISTORS: | |
| 88,164,256 | 2N5088 |
| 216 | 1N4002 |
| 222 | 6.8volts, 1 watt |
| 230,232 | 1N34 |

Accordingly, an ultrasonic alarm system has been disclosed which is efficient in operation and which includes a transmitter that latches in the transmit mode after it has been actuated to prevent unauthorized personnel from deactivating the unit.

While a preferred embodiment of the invention has been shown and disclosed herein, it will become obvious that numerous omissions, changes and additions may be made in such embodiment without departing from the spirit and scope of the present invention.

What is claimed is:

1. An ultrasonic alarm system comprising a transmitter, said transmitter comprising an ultrasonic carrier frequency signal generator, modulation means for modulating said carrier signal with a modulation signal, and transmission means for transmitting said modulated ultrasonic carrier signal; and at least one receiver, said receiver comprising receiving means for receiving said transmitted modulated ultrasonic carrier signal, demodulating means for demodulating said modulated carrier signal to obtain said modulation signal, and detector means connected to said demodulating means and responsive to a predetermined characteristic of the demodulated signal for producing an alarm actuation signal, said switch means comprising a pushbutton having an enlarged diameter portion and a reduced diameter depending shaft, a button support having a through bore slidingly receiving said shaft for movement of said button from a first position to a second position, said latching means comprises first and second spaced grooves on said shaft connected by a cam surface, and a member on said board normally biased into engagement with one of said grooves when said button is in said first position, said member being operable to ride on said cam surface and into engagement with said second groove when said button is moved to the second position to latch said button in said second position, said switch means further comprising a fixed contact and a movable contact spaced from said fixed contact and abutting said enlarged portion and positioned to be moved into contact with said stationary contact when said button is moved from said first to said second position whereby said switch means is moved from the open to the closed position.

2. An ultrasonic alarm system as in claim 1, and a threaded opening in said button adapted to engage a threaded member therein, whereby an outwardly directed force applied to said threaded member effects movement of said button to the first position, said second groove being a downwardly sloping wall to facilitate movement of said member out of engagement with said second groove when said button is moved outwardly.

3. An ultrasonic alarm system as in claim 1, and a slot in the bottom wall of said reduced diameter shaft adapted to receive a complementary formed device therein, said shaft having a rounded peripheral wall whereby rotation of said device received in said slot causes said peripheral wall to engage and move said member outwardly of said second groove to permit said pushbutton to return to said first position.

4. An ultrasonic alarm system as in claim 1, in which said detector means comprises a phase locked loop having a phase comparitor that produces a control signal at output terminals proportional to the difference in frequencies between signals applied to a first and a second set of input terminals, a lead connecting said demodulating means to said first set of input terminals, a variable frequency oscillator for producing a signal the frequency of which is dependent on said control signal, a lead connecting said variable frequency oscillator to said second set of input terminals, a lead connecting said phase comparitor output terminals to said variable frequency oscillator to apply said control signal thereto, said control signal corresponding to said alarm actuation signal when said control signal reaches a preselected level.

5. An ultrasonic alarm system as in claim 1, in which said transmission means comprises a ceramic crystal, a tuned circuit connecting said crystal with said carrier frequency signal generator, and a resistor serially connected between said tuned circuit and said crystal.

6. An ultrasonic alarm system as in claim 1, in which said detector means comprises a phase detector having an output lead for changing the signal on said output lead from a first to a second state in response to reception of said demodulated signal, a relay, means connected in series with said relay and to said output lead for connecting said relay with a source of potential when said output signal from said phase detector is in said first state and for disconnecting said relay from the source of potential when said output signal is in said second state, an alarm indicator, and a pair of relay normally-open contacts connected to said alarm indicator and controlled by said relay, whereupon said alarm indicator indicates an alarm condition in response to the open condition of said relay contacts.

7. A transmitter for an ultrasonic alarm system comprising a plurality of electrically-operated elements for producing and transmitting an ultrasonic alarm system, a pair of input terminals adapted to be connected to a source of power for energizing said electrically-operated elements, a switch movable from an open to a closed state to connect said pair of input terminals in circuit with said plurality of electrically-operated elements, latching means for latching said switch in said closed state, said switch means comprising a pushbutton having an enlarged diameter portion and a reduced diameter depending shaft, a button support having a through bore slidingly receiving said shaft for movement of said button from a first position to a second position, said latch comprising first and second spaced grooves on said shaft connected by a cam surface, and a member on said board normally biased into engagement with one of said grooves when said button is in said first position, said member being operable to ride on said cam surface and into engagement with said second groove when said button is moved to the second position to latch said button in said second position, said switch further comprising a fixed contact on said board, and a movable contact spaced from said fixed contact and abutting said enlarged portion and positioned to be moved from said first to said second position whereby said switch is moved from the open to the closed state.

8. A transmitter as in claim 7, and a threaded opening in said button adapted to engage a threaded member therein, whereby an outwardly directed force applied to said threaded member effects movement of said button to the first position, said second groove having a downwardly sloping wall to facilitate movement of said member out of engagement with said second groove when said button is moved outwardly.

9. A transmitter as in claim 7, and a slot in the bottom wall of said reduced diameter shaft adapted to receive a complementary formed device therein, said shaft having a rounded peripheral wall whereby rotation of said device received in said slot causes said peripheral wall to engage and move said member outwardly of said second groove to permit said pushbutton to return to said first position.

10. A transmitter as in claim 7, in which one of said plurality of elements comprises a 40KH$_z$ carrier frequency oscillator and another of said elements comprises a 300H$_z$ modulator for amplitude modulating the carrier signal.

* * * * *